(12) United States Patent
Sohn

(10) Patent No.: US 8,968,905 B2
(45) Date of Patent: Mar. 3, 2015

(54) SECONDARY BATTERY

(75) Inventor: Youngbae Sohn, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 272 days.

(21) Appl. No.: 12/805,794

(22) Filed: Aug. 19, 2010

(65) Prior Publication Data

US 2011/0171521 A1  Jul. 14, 2011

(30) Foreign Application Priority Data

Jan. 12, 2010 (KR) ................... 10-2010-0002629

(51) Int. Cl.
- *H01M 10/6551* (2014.01)
- *H01M 10/6553* (2014.01)
- *H01M 10/654* (2014.01)
- *H01M 2/02* (2006.01)
- *H01M 10/613* (2014.01)
- *H01M 10/623* (2014.01)
- *H01M 10/6554* (2014.01)
- *H01M 10/653* (2014.01)

(52) U.S. Cl.
CPC ........ *H01M 10/5042* (2013.01); *H01M 2/0207* (2013.01); *H01M 10/5004* (2013.01); *H01M 10/5012* (2013.01); *H01M 10/5053* (2013.01); *H01M 10/504* (2013.01)
USPC ............ 429/120; 429/167; 429/168; 429/179

(58) Field of Classification Search
CPC . H01M 2/025; H01M 2/0252; H01M 2/0443; H01M 2/0447; H01M 2/30; H01M 6/5038; H01M 10/50; H01M 10/5004; H01M 10/5034; H01M 10/504; H01M 10/5044; H01M 10/5046; H01M 10/5053
USPC ............................. 429/61, 62, 120, 163–187
See application file for complete search history.

(56) References Cited

U.S. PATENT DOCUMENTS

| | | | |
|---|---|---|---|
| 4,322,484 A * | 3/1982 | Sugalski | 429/94 |
| 5,478,667 A * | 12/1995 | Shackle et al. | 429/120 |
| 6,146,786 A * | 11/2000 | Stadnick et al. | 429/101 |
| 6,391,491 B1 * | 5/2002 | Kim | 429/178 |
| 6,696,197 B2 * | 2/2004 | Inagaki et al. | 429/120 |
| 6,703,158 B1 * | 3/2004 | Hirano | 429/94 |
| 6,913,852 B2 * | 7/2005 | Nakanishi et al. | 429/99 |
| 2002/0064706 A1 * | 5/2002 | Zhang et al. | 429/120 |
| 2005/0238953 A1 * | 10/2005 | Urso et al. | 429/163 |
| 2006/0105237 A1 * | 5/2006 | Oh | 429/180 |
| 2006/0263681 A1 * | 11/2006 | Lee | 429/176 |
| 2006/0286450 A1 * | 12/2006 | Yoon et al. | 429/180 |
| 2007/0269714 A1 * | 11/2007 | Watanabe et al. | 429/120 |

(Continued)

FOREIGN PATENT DOCUMENTS

| | | |
|---|---|---|
| KR | 10 2005-0014426 A | 2/2005 |
| KR | 10 2005-0107386 A | 11/2005 |

(Continued)

*Primary Examiner* — Jonathan G Leong
*Assistant Examiner* — James Erwin
(74) *Attorney, Agent, or Firm* — Lee & Morse, P.C.

(57) ABSTRACT

A secondary battery including an electrode assembly, the electrode assembly including a positive electrode plate, a negative electrode plate, and a separator; a pouch accommodating the electrode assembly; and a dissipation member, the dissipation member contacting the electrode assembly and protruding to an exterior of the pouch from an interior of the pouch.

10 Claims, 7 Drawing Sheets

(56) References Cited

U.S. PATENT DOCUMENTS

| | | | |
|---|---|---|---|
| 2008/0182156 A1* | 7/2008 | Atkinson et al. | 429/50 |
| 2008/0193838 A1* | 8/2008 | Oh | 429/175 |
| 2009/0023057 A1 | 1/2009 | Kim | |
| 2009/0035648 A1* | 2/2009 | Kimura | 429/120 |

FOREIGN PATENT DOCUMENTS

| | | | | |
|---|---|---|---|---|
| KR | 10 2006-0102207 A | 9/2006 | | |
| KR | 10 2007-0051446 A | 5/2007 | | |
| KR | 10-0870355 B1 | 11/2008 | | |
| WO | WO 2009/066881 | * | 5/2009 | H01M 2/10 |

* cited by examiner

SECONDARY BATTERY

BACKGROUND

1. Field

Embodiments relate to a secondary battery.

2. Description of the Related Art

Lithium secondary batteries may be manufactured in various shapes and may include, e.g., a pouch type, a cylindrical type, or a prismatic type secondary battery. Recently more attention has been focused on pouch type secondary batteries, which may be flexible in shape and may be lightweight. Accordingly, pouch type secondary batteries may be suitable for slim, lightweight portable electronic devices.

The pouch-type secondary battery may include a freely bendable case formed of a thin metal film and an insulating film attached to both surfaces thereof, unlike a circular or prismatic case formed of a thick metal. A space for accommodating the electrode assembly may be formed in the case.

SUMMARY OF THE INVENTION

Embodiments are directed to a secondary battery, which represents advances over the related art.

It is a feature of an embodiment to provide a secondary battery that can rapidly dissipate heat generated at an electrode assembly.

At least one of the above and other features and advantages may be realized by providing a secondary battery including an electrode assembly, the electrode assembly including a positive electrode plate, a negative electrode plate, and a separator; a pouch accommodating the electrode assembly; and a dissipation member, the dissipation member contacting the electrode assembly and protruding to an exterior of the pouch from an interior of the pouch.

The dissipation member may be integrally formed with the electrode assembly.

The dissipation member may include a portion of the positive electrode plate protruding to an exterior of the pouch.

The dissipation member may include a portion of the negative electrode plate protruding to an exterior of the pouch.

The dissipation member may be coupled to the electrode assembly.

The dissipation member may be coupled to the positive electrode plate.

The dissipation member may be coupled to the negative electrode plate.

The dissipation member may protrude from opposing sides of the pouch.

An adhesive layer may be disposed at a portion of the dissipation member.

The adhesive layer may be disposed to correspond to a sealing portion of the pouch.

The adhesive layer may be thermally fused to the pouch.

The dissipation member may surround the pouch.

The dissipation member may protrude from one side of the pouch.

The dissipation member may be made of aluminum or copper.

The electrode assembly may include electrode tabs protruding to an exterior of the pouch and the dissipation member may also protrude to the exterior of the pouch in a direction perpendicular to the electrode tabs.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION OF THE INVENTION

Figure 1A:
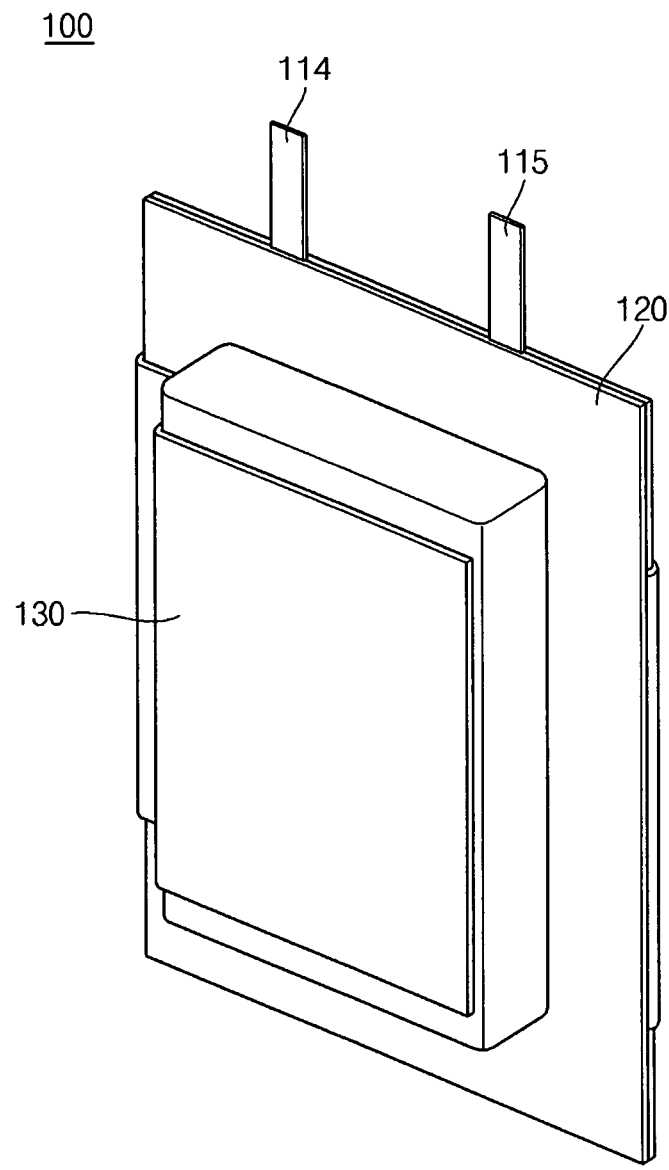
FIG. 1A illustrates a perspective view of a secondary battery according to an embodiment.

Korean Patent Application No. 10-2010-0002629, filed on Jan. 12, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1B:
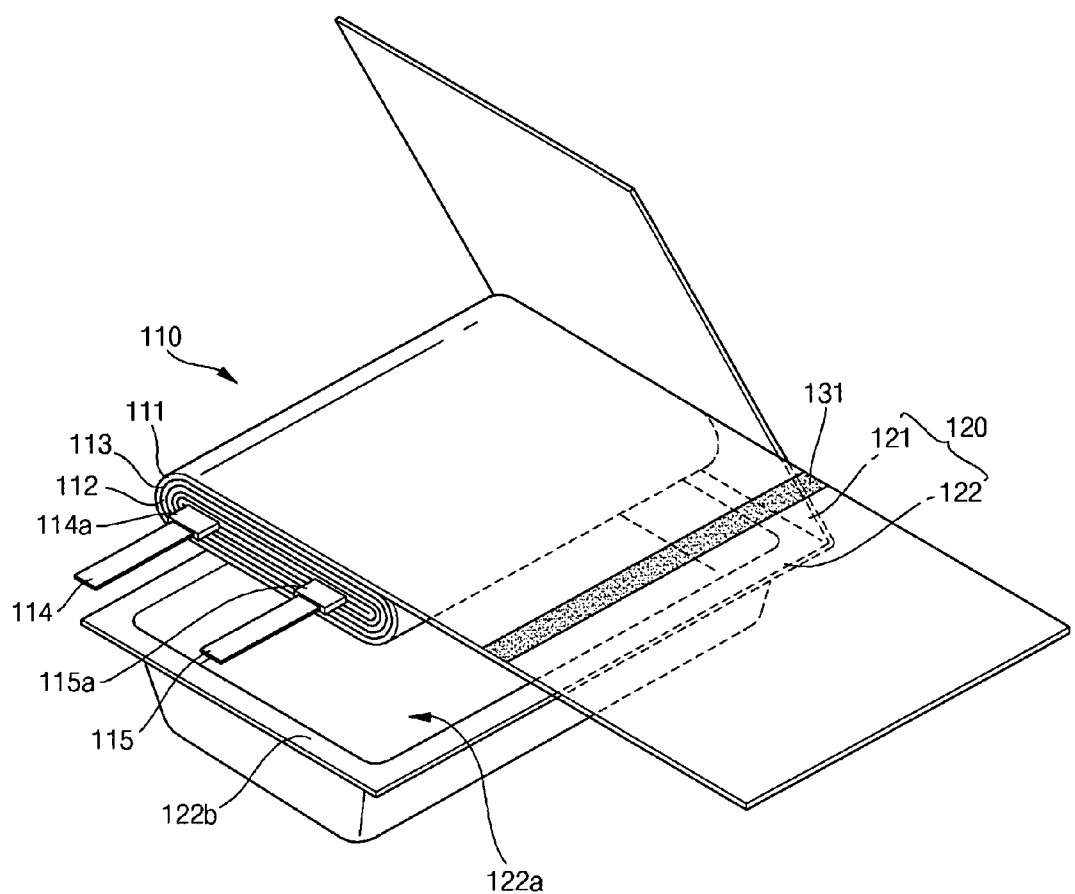
FIG. 1B illustrates an exploded perspective view of the secondary battery illustrated in FIG. 1A.
Figure 1C:
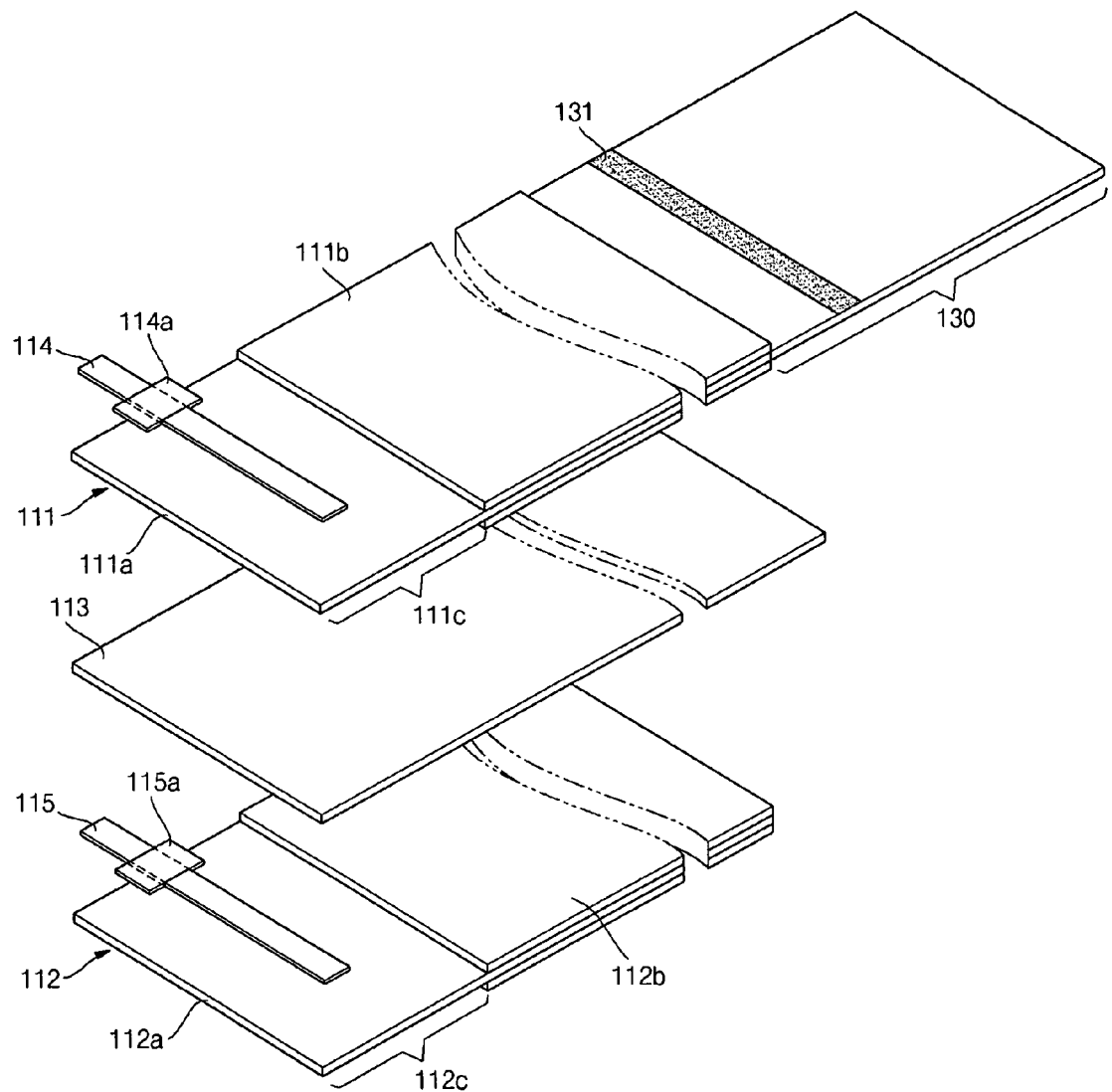
FIG. 1C illustrates a perspective view of an unwound state of an electrode assembly illustrated in FIG. 1B.

FIG. 1A illustrates a perspective view of a secondary battery according to an embodiment. FIG. 1B illustrates an exploded perspective view of the secondary battery illustrated in FIG. 1A. FIG. 1C illustrates a perspective view of an unwound state of an electrode assembly illustrated in FIG. 1B.

Referring to FIGS. 1A through 1C, the secondary battery 100 may include an electrode assembly 110, a pouch 120, and a dissipation member 130.

The electrode assembly 110 may include a positive electrode plate 111, a negative electrode plate 112, and a separator 113 interposed between the positive electrode plate 111 and the negative electrode plate 112.

The positive electrode plate 111 may include a positive electrode collector 111a formed of a thin metal plate having excellent conductivity, e.g., aluminum (Al) foil, and a positive electrode coated portion 111b coated on a portion of both surfaces of the positive electrode collector 111a. The positive electrode coated portion 111b may include a chalcogenide compound exemplified by composite metal oxides, e.g., $LiCoO_2$, $LiMn_2O_4$, $LiNiO_2$, and/or $LiNiMnO_2$. A positive electrode tab 114 may be disposed on a positive electrode uncoated portion 111c of the positive electrode collector 111a. The positive electrode uncoated portion 111c may include a portion of the positive electrode collector 111a where the positive electrode coated portion 111b is not formed. In other words, one end of the positive electrode tab 114 may be electrically connected to the positive electrode uncoated portion 111*c*; and another end thereof may protrude outside of the electrode assembly 110. In an implementation, the positive electrode tab 114 may be attached to the positive electrode uncoated portion 111*c* using an insulating member 114*a*.

The negative electrode plate 112 may include a negative electrode collector 112*a* formed of a thin metal plate having excellent conductivity, e.g., copper (Cu) or nickel (Ni) foil, and a negative electrode coated portion 112*b* coated on a portion of both surfaces of the negative electrode collector 112*a*. The negative electrode coated portion 112*b* may include, e.g., Si, Sn, tin oxide, tin alloy composite, transition metal oxide, lithium metal nitride, metal oxide, and/or carbon materials, but are not limited thereto. A negative electrode tab 115 may be disposed on a negative electrode uncoated portion 112*c* of the negative electrode collector 112*a*. The negative electrode uncoated portion 112*c* may include a portion of the negative electrode collector 112*a* where the negative electrode coated portion 112*b* is not formed. In other words, one end of the negative electrode tab 115 may be electrically connected to the negative electrode uncoated portion 112*c* and another end thereof may protrude outside of the electrode assembly 110. In an implementation, the negative electrode tab 115 may be attached to the negative electrode uncoated portion 112*c* using an insulating member 115*a*.

The positive and negative insulating members 114*a* and 115*a* respectively disposed on the positive and negative electrode tabs 114 and 115 may prevent electrical shorts between the positive and negative electrode tabs 114 and 115 and between each of the positive and negative electrode tabs 114 and 115 and each of the positive and negative electrode plates 111 and 112. In addition, the positive and negative insulating members 114*a* and 115*a* may prevent electrical shorts between the pouch 120 and the positive and negative electrode tabs 114 and 115 when sealing the pouch 120 after the electrode assembly 110 is accommodated in the pouch 120. Accordingly, the positive and negative insulating members 114*a* and 115*a* may be made of an insulating material capable of preventing electrical shorts and also having resistance against the electrolyte. In an implementation, the positive and negative insulating members 114*a* and 115*a* may be formed of insulating tapes including, e.g., polyphenylene sulfide (PS), polyimide (PI), and/or polypropylene (PP).

The separator 113 may be interposed between the positive electrode plate 111 and the negative electrode plate 112 to prevent electrical shorts between the positive electrode plate 111 and the negative electrode plate 112. The separator 113 may be made of, e.g., polyethylene, polypropylene, and/or a copolymer of polyethylene and polypropylene, but are not limited thereto. In order to prevent electrical shorts between the positive electrode plate 111 and the negative electrode plate 112, the separator 113 may be wider than the positive electrode plate 111 and/or the negative electrode plate 112.

The pouch 120 may include an upper pouch layer 121 and a lower pouch layer 122 created by folding a mid portion of a rectangular pouch layer integrally formed with the pouch 120 in a lengthwise direction of its one side. A recess 122*a* may be formed in the lower pouch layer 122 by, e.g., pressing, to accommodate the electrode assembly 110 therein. A sealing part 122*b* may also be formed in the lower pouch layer 122 to be sealed with the upper pouch layer 121. The pouch 120 may have a multi-layer structure including an insulating layer formed on an internal surface thereof and a protective layer formed on an outer surface thereof and a metal layer therebetween.

The insulating layer may be formed on the internal surface of the pouch 120 and may be made of an insulating thermally adhesive material. In an implementation, the insulating layer may be made of, e.g., cast polypropylene (CPP) that is not reactive with electrolyte, or equivalents thereof. The metal layer may prevent external moisture from being introduced into the secondary battery 100 and may prevent electrolyte inside the secondary battery 100 from leaking. The protective layer may be formed on an external surface of the pouch 120. The protective layer may be made of a material capable of reducing mechanical and chemical impacts from external electronic equipment, e.g., nylon, polyethyleneterephthalate (PET), and the like.

The dissipation member 130 may protrude from an interior to an exterior of the pouch 120. The dissipation member 130 may be made of a, e.g., thermally, conductive material and may allow heat generated at the electrode assembly 110 to be dissipated outside of the electrode assembly 110. In an implementation, the dissipation member 130 may be integrally formed with the electrode assembly 110. In an alternative implementation, the dissipation member 130 may be coupled to the electrode assembly 110. An adhesive layer 131 may be disposed on or in the dissipation member 130.

The adhesive layer 131 may be disposed to correspond to the sealing part 122*b* of the pouch 120 and a portion sealed with the dissipation member 130. In other words, the adhesive layer 131 may be disposed at a portion of the dissipation member 130 where the sealing part 122*b* of the pouch 120 contacts the portion sealed with the dissipation member 130 when sealing the pouch 120. Thus, the dissipation member 130 made of a metal and the pouch 120 may be sealed to each other with enhanced sealing efficiency. In an implementation, the adhesive layer 131 and the pouch 120 may be, e.g., thermally fused. The adhesive layer 131 may prevent an electrical short between the pouch 120 and the dissipation member 130.

The dissipation member 130 will now be described in detail with reference FIG. 1C.

In an implementation, the dissipation member 130 may be formed from a portion of the positive electrode plate 111 protruding outside the pouch 120. In particular, the dissipation member 130 may be formed by extending the positive electrode collector 111*a* formed of a thin metal plate of the positive electrode plate 111. In other words, the dissipation member 130 may be integrally formed with the positive electrode collector 111*a*. The dissipation member 130 may be made of, e.g., aluminum (Al), like the positive electrode collector 111*a*. The dissipation member 130 may be formed such that it is spaced apart from the positive electrode coated portion 111*b* without an active material coated on the positive electrode collector 111*a*. Thus, the dissipation member 130 may not be coated with an active material, like the positive electrode uncoated portion 111*c*.

With such a configuration, the secondary battery 100 will now be described. The electrode assembly 110 may be mounted in the recess 122*a* of the lower pouch layer 122. Ends of the positive electrode tab 114 and the negative electrode tab 115 of the electrode assembly 110 may protrude to the exterior of the pouch 120 sealed thereto. In addition, the dissipation member 130 formed from an extension of the positive electrode plate 111 may also protrude to the exterior of the pouch 120. The dissipation member 130 may protrude in a direction perpendicular to the electrode tabs 114 and 115, i.e., to protrude in a different direction than that in which the electrode tabs 114 and 115 protrude. After the electrode assembly 110 is mounted in the pouch 120, the electrolyte may be injected into the recess 122*a* and heat and pressure may be applied to the sealing part 122*b* along the edge of the recess 122a, thus sealing the pouch 120. After sealing the pouch 120, the dissipation member 130 protruding outside the pouch 120 may surround the pouch 120.

As described above, the secondary battery 100 may be configured such that the dissipation member 130 is integrally formed with the electrode assembly 110 and protrudes from the interior to the exterior of the pouch 120. Accordingly, the secondary battery 100 according to the present embodiment may rapidly dissipate the heat generated at the electrode assembly 110 to the exterior of the electrode assembly 110.

As indicated, the dissipation member 130 of the secondary battery 100 may surround the pouch 120. With such a configuration, heat generated at the electrode assembly 110 may rapidly be dissipated to the exterior of the electrode assembly 110.

Next, a secondary battery according to another embodiment will be described.

The secondary battery according to the present embodiment substantially the same as the secondary battery 100 according to the previous embodiment with respect to configuration and function, except for the location of a dissipation member 230. Therefore, the secondary battery according to the present embodiment will be described with regard to the dissipation member 230.

Figure 2:
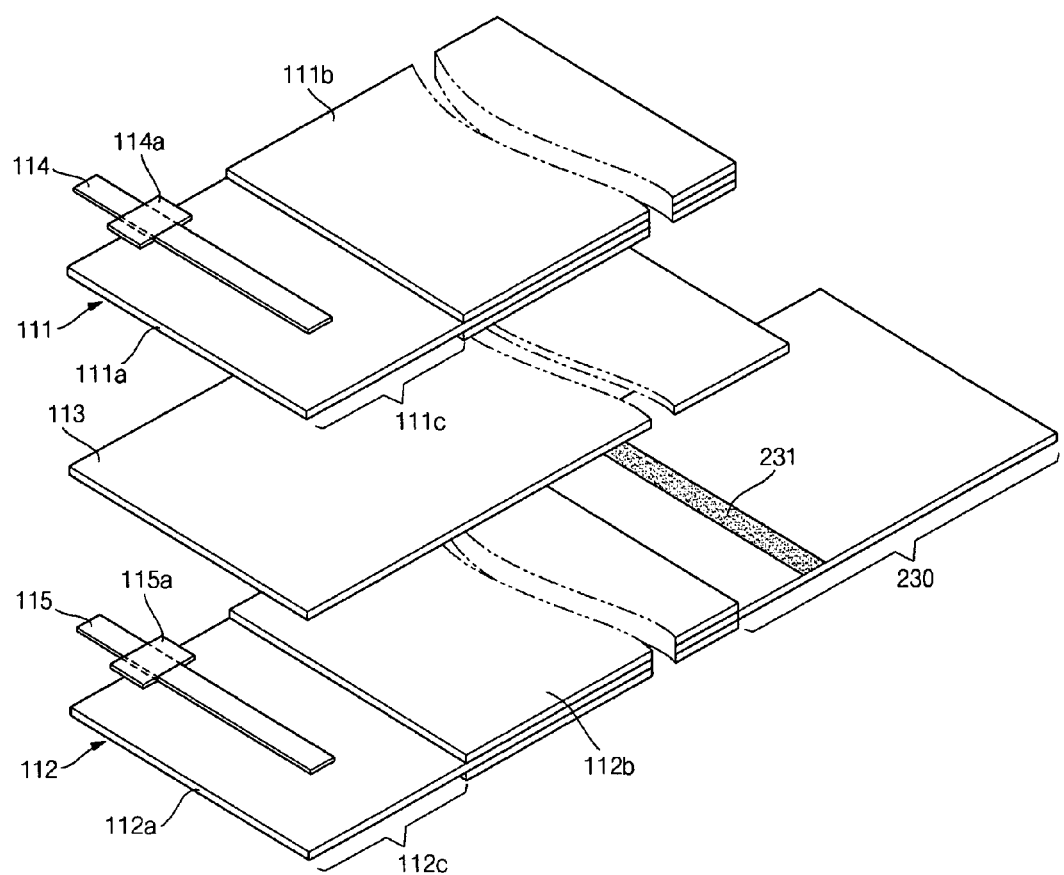
FIG. 2 illustrates a perspective view of an unwound state of an electrode assembly of a secondary battery according to another embodiment.

FIG. 2 illustrates a perspective view of an unwound state of an electrode assembly of a secondary battery according to the present embodiment.

The secondary battery may include an electrode assembly 110, a pouch 120, and a dissipation member 230.

Referring to FIG. 2, the dissipation member 230 may be integrally formed with the electrode assembly 110. An adhesive layer 231 may also be disposed in or on the dissipation member 230.

The dissipation member 230 may extend from a portion of the negative electrode plate 112 and protrude to the exterior of the pouch 120. The dissipation member 230 may be formed by extending the negative electrode collector 112a formed of a thin metal plate of the negative electrode plate 112. In other words, the dissipation member 230 may be integrally formed with the negative electrode collector 112a. The dissipation member 230 may be made of, e.g., copper (Cu), like the negative electrode collector 112a. The dissipation member 230 may be formed such that it is spaced apart from the negative electrode coated portion 112b but without an active material such as is coated on the negative electrode collector 112a. Thus, the dissipation member 230 may not be coated with an active material, like the negative electrode uncoated portion 112c.

As described above, in the secondary battery according to the present embodiment, the dissipation member 230 may be an extension of the negative electrode collector 112a, i.e., integrally formed with the electrode assembly 110 and may protrude from the interior to the exterior of the pouch 120. Accordingly, the secondary battery according to the present embodiment may rapidly dissipate heat generated at an electrode assembly.

Next, a secondary battery according to yet another embodiment will be described.

The secondary battery according to the present embodiment is substantially the same as the secondary battery 100 according to the previous embodiment with respect to configuration and function, except for the location of a dissipation member 330. Therefore, the secondary battery according to the present embodiment will be described with regard to the dissipation member 330.

Figure 3:
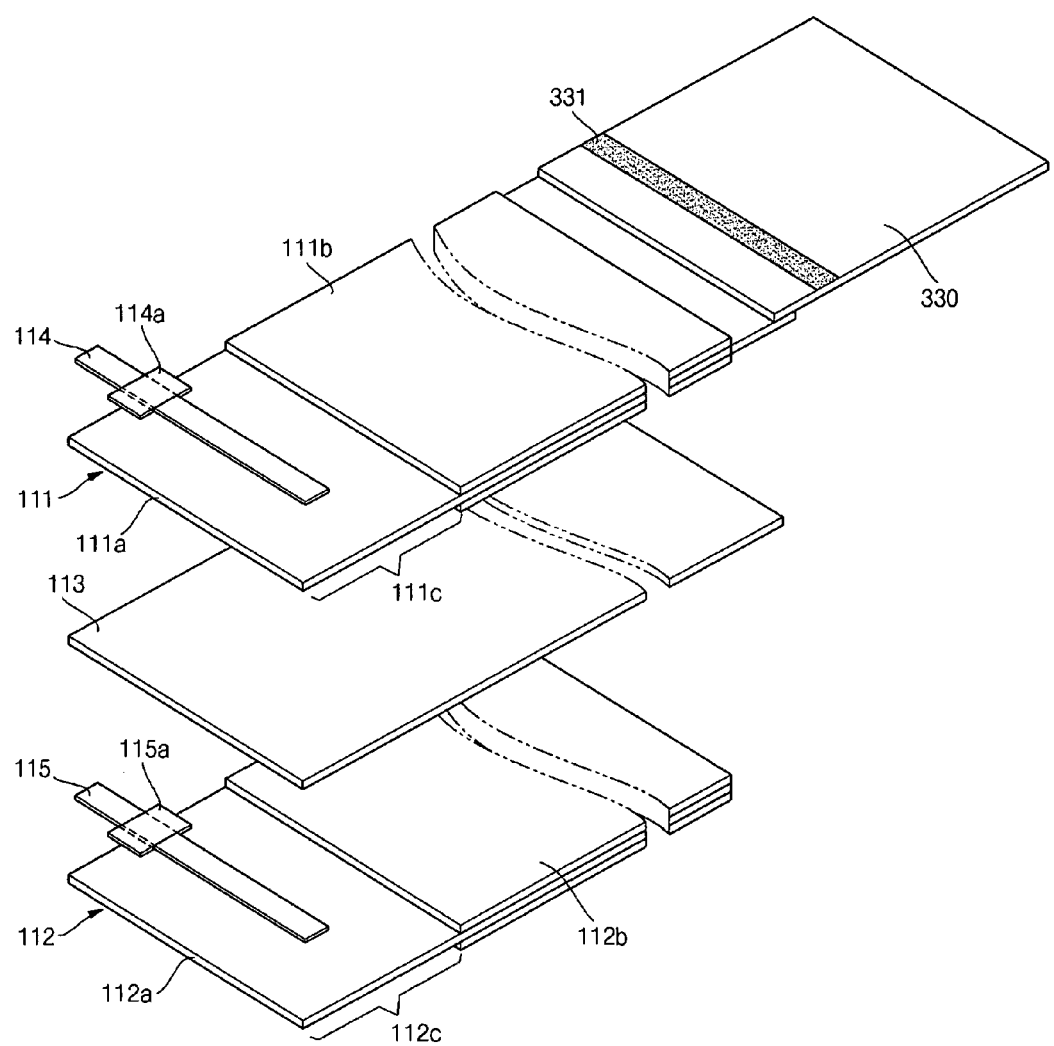
FIG. 3 illustrates a perspective view of an unwound state of an electrode assembly of a secondary battery according to yet another embodiment.

FIG. 3 illustrates a perspective view of an unwound state of an electrode assembly of a secondary battery according to the present embodiment.

The secondary battery according to the present embodiment may include an electrode assembly 110, a pouch 120, and a dissipation member 330.

Referring to FIG. 3, the dissipation member 330 may be electrically connected to the electrode assembly 110. An adhesive layer 331 may also be disposed on or in the dissipation member 330.

One side of the dissipation member 330 may be coupled to a positive electrode plate 111 and another side thereof may protrude to the exterior of the pouch 120. The dissipation member 330 may be coupled to a positive electrode collector 111a of the positive electrode plate 111, which is formed of a thin metal film. The dissipation member 330 may be coupled to the positive electrode collector 111a using, e.g., a conductive adhesive agent, or by, e.g., resistance welding or laser welding. The dissipation member 330 may be coupled to a portion of the positive electrode collector 111a on which no active material is disposed. In other words, the dissipation member 330 may be coupled to a surface of the positive electrode uncoated portion 111c on which the positive electrode tab 114 is attached or on an opposite surface of the positive electrode uncoated portion 111c, to be electrically connected to the positive electrode plate 111. The dissipation member 330 may be made of, e.g., aluminum (Al), like the positive electrode collector 111a.

As described above, the secondary battery according to the present embodiment may be configured such that the dissipation member 330 is electrically connected to the positive electrode plate 111 and protrudes from the interior to the exterior of the pouch 120. Accordingly, the secondary battery according to the present embodiment may rapidly dissipate heat generated at the electrode assembly 110 to the exterior of the electrode assembly 110.

Next, a secondary battery according to still another embodiment of the present invention will be described.

The secondary battery according to the present embodiment is substantially the same as the secondary battery 100 according to the previous embodiment with respect to configuration and function, except for the location of a dissipation member 430. Therefore, the secondary battery according to the present embodiment will be described with regard to the dissipation member 430.

Figure 4:
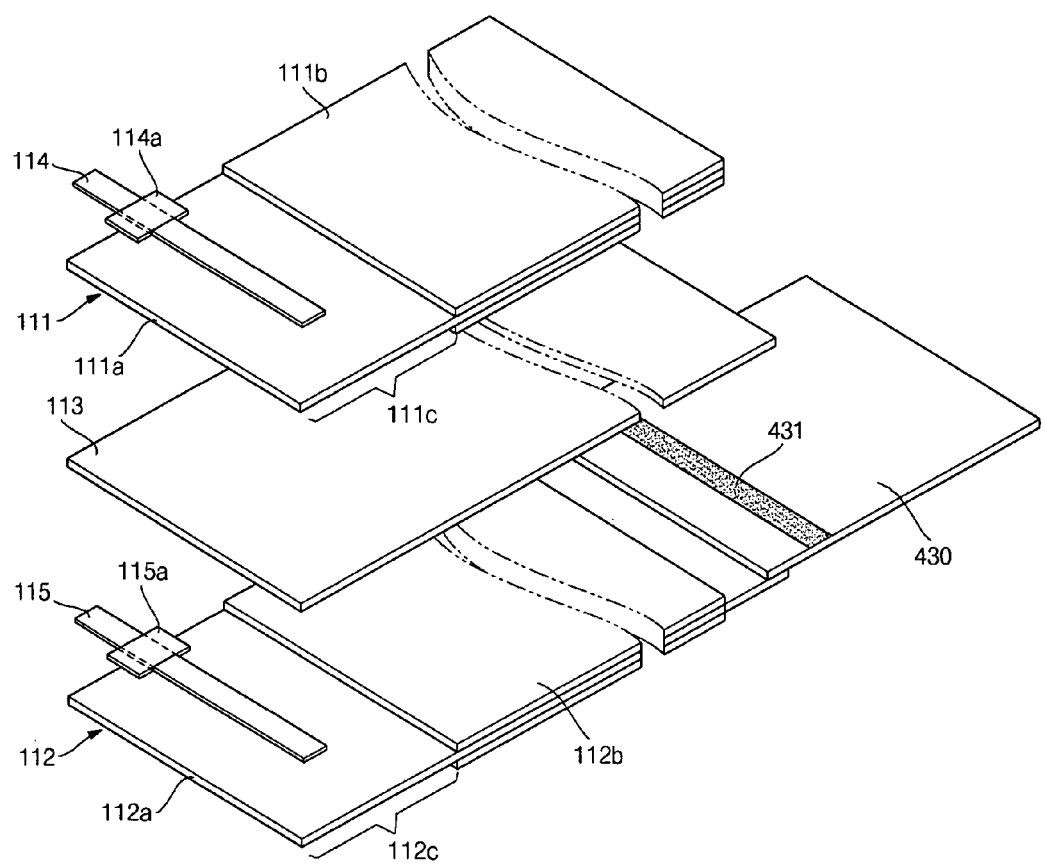
FIG. 4 illustrates a perspective view of an unwound state of an electrode assembly of a secondary battery according to still another embodiment.

FIG. 4 illustrates a perspective view of an unwound state of an electrode assembly of a secondary battery according to the present embodiment.

The secondary battery according to according to the present embodiment may include an electrode assembly 110, a pouch 120, and a dissipation member 430.

Referring to FIG. 4, the dissipation member 430 may be electrically connected to the electrode assembly 110. An adhesive layer 431 may also be disposed on or in the dissipation member 430.

One side of the dissipation member 430 may be coupled to a negative electrode plate 112 and another side thereof may protrude to the exterior of the pouch 120. The dissipation member 430 may be coupled to a negative electrode collector 112a of the negative electrode plate 112, which is formed of a thin metal film. The dissipation member 430 may be coupled to the negative electrode collector 112a using, e.g., a conductive adhesive agent, or by, e.g., resistance welding or laser welding. In addition, the dissipation member 430 may be coupled to a portion of the negative electrode collector 112a, on which no active material is disposed. The dissipation member 330 may be coupled to a surface of the negative electrode uncoated portion 112c on which the negative electrode tab 115 is attached, or on an opposite surface of the negative electrode uncoated portion 112c, to be electrically connected to the negative electrode plate 112. The dissipation member 430 may be made of, e.g., copper (Cu), like the negative electrode collector 112a.

As described above, the secondary battery according to the present embodiment may be configured such that the dissipation member 430 is electrically connected to the negative electrode plate 112 and protrudes from the interior to the exterior of the pouch 120. Accordingly, the secondary battery according to the present embodiment may rapidly dissipate the heat generated at the electrode assembly 110 to the exterior of the electrode assembly 110.

Next, a secondary battery according to still another embodiment will be described.

The secondary battery according to the present embodiment is substantially the same as the secondary battery 100 according to the previous embodiment with respect to configuration and function, except for the location of a dissipation member 530. Therefore, the secondary battery according to the present embodiment will be described with regard to the dissipation member 530.

Figure 5:
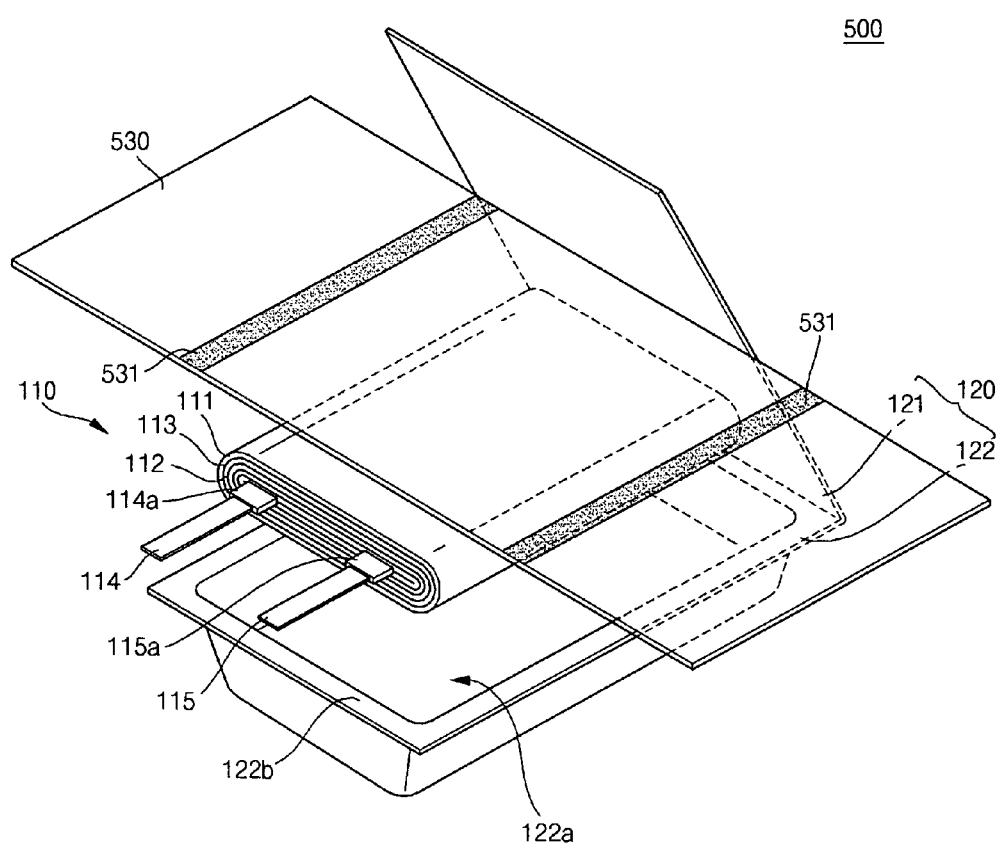
FIG. 5 illustrates an exploded perspective view of a secondary battery according to still another embodiment.

FIG. 5 illustrates an exploded perspective view of a secondary battery according to the present embodiment.

Referring to FIG. 5, the secondary battery 500 may include an electrode assembly 110, a pouch 120, and a dissipation member 530.

After the electrode assembly 110 is wound, the dissipation member 530 may be coupled to a surface of the electrode assembly 110. The dissipation member 530 may be coupled to the electrode assembly 110 using, e.g., an adhesive agent. When the electrode assembly 110 is mounted in a recess 122a of a lower pouch layer 122, a positive electrode tab 114 and a negative electrode tab 115 of the electrode assembly 110 may protrude to the exterior of the pouch 120. The dissipation member 530 may protrude in a different direction from the direction that the electrode tabs 114 and 115 protrude. In other words, both ends of the dissipation member 530 may protrude to the exterior of the pouch 120 in a direction, e.g., perpendicular, to the protruding direction of the electrode tabs 114 and 115. Here, an adhesive layer 531 may be formed on both sides of the dissipation member 530 to then be coupled with a sealing part 122b of the pouch 120. Therefore, since the adhesive layer 531 may be formed on both opposing sides of the dissipation member 530 sealed with the sealing part 122b of the pouch 120, the dissipation member 530 and the pouch 120 may be sealed to each other with enhanced sealing efficiency. In an implementation, the adhesive layer 531 and the pouch 120 may be, e.g., thermally fused. After sealing the pouch 120, the dissipation member 530 may protrude to opposite sides of the pouch 120. One end of the dissipation member 530 may surround a front surface of the pouch 120 while another end of the dissipation member 530 may surround a rear surface of the pouch 120.

As described above, the secondary battery 500 according to the present embodiment may be configured such that the dissipation member 530 is coupled to the electrode assembly 110 and protrudes from the interior to the exterior of the pouch 120. Accordingly, the secondary battery 500 according to the present embodiment may rapidly dissipate the heat generated at the electrode assembly 110 to the exterior of the electrode assembly 110.

In the pouch-type secondary battery, since the case itself may be made of a soft material, it may have low strength, and it may be quite difficult to apply a separate structure required for improving heat dissipating characteristics to the structurally weak case. Yet, with the use of a dissipation member according to the embodiments, internal heat of the case may be effectively dissipated.

As described above, since the secondary battery according to an embodiment may include a dissipation member integrated with or coupled to an electrode assembly and protrudes from the interior to the exterior of a pouch, the heat generated at the electrode assembly can be rapidly dissipated outside.

In addition, in the secondary battery according to an embodiment, since the dissipation member may surround the pouch, the heat generated at the electrode assembly may be rapidly dissipated outside.

Exemplary embodiments have been disclosed herein, and although specific terms are employed, they are used and are to be interpreted in a generic and descriptive sense only and not for purpose of limitation. (Al) Accordingly, it will be understood by those of ordinary skill in the art that various changes in form and details may be made without departing from the spirit and scope of the present invention as set forth in the following claims.

What is claimed is:

1. A secondary battery, comprising:
an electrode assembly, the electrode assembly including a positive electrode plate, a negative electrode plate, and a separator;
a pouch accommodating the electrode assembly; and
a heat dissipation member, the heat dissipation member being electrically connected to the electrode assembly and protruding through the pouch to an exterior of the pouch from an interior of the pouch,
wherein the heat dissipation member is of one physically continuous piece with the positive electrode plate or the negative electrode plate of the electrode assembly,
wherein the electrode assembly includes electrode tabs protruding through the pouch to an exterior of the pouch,
wherein the heat dissipation member protrudes through a side of the pouch that is perpendicular to a side of the pouch through which the electrode tabs protrude, and
wherein the heat dissipation member surrounds side surfaces of the pouch.

2. The secondary battery as claimed in claim 1, wherein the heat dissipation member is of one physically continuous piece with the positive electrode plate.

3. The secondary battery as claimed in claim 1, wherein the heat dissipation member is of one physically continuous piece with the negative electrode plate.

4. The secondary battery as claimed in claim 1, wherein an adhesive layer is disposed at a portion of the heat dissipation member.

5. The secondary battery as claimed in claim 4, wherein the adhesive layer is disposed to correspond to a sealing portion of the pouch.

6. The secondary battery as claimed in claim 4, wherein the adhesive layer is thermally fused to the pouch.

7. The secondary battery as claimed in claim 1, wherein the heat dissipation member protrudes from one side of the pouch.

8. The secondary battery as claimed in claim 1, wherein the heat dissipation member is made of aluminum or copper.

9. The secondary battery as claimed in claim 1, wherein the heat dissipation member has a same width as a width of the positive electrode plate or the negative electrode plate of the electrode assembly with which the heat dissipation member is of one continuous piece.

10. The secondary battery as claimed in claim 1, wherein the heat dissipation member has a uniform width along a length thereof.

\* \* \* \* \*